Oct. 27, 1970
J. W. HENDRY
3,535,737
PLASTICIZING APPARATUS WITH VOLATILE WITHDRAWAL SYSTEM
Filed July 28, 1967
2 Sheets-Sheet 1
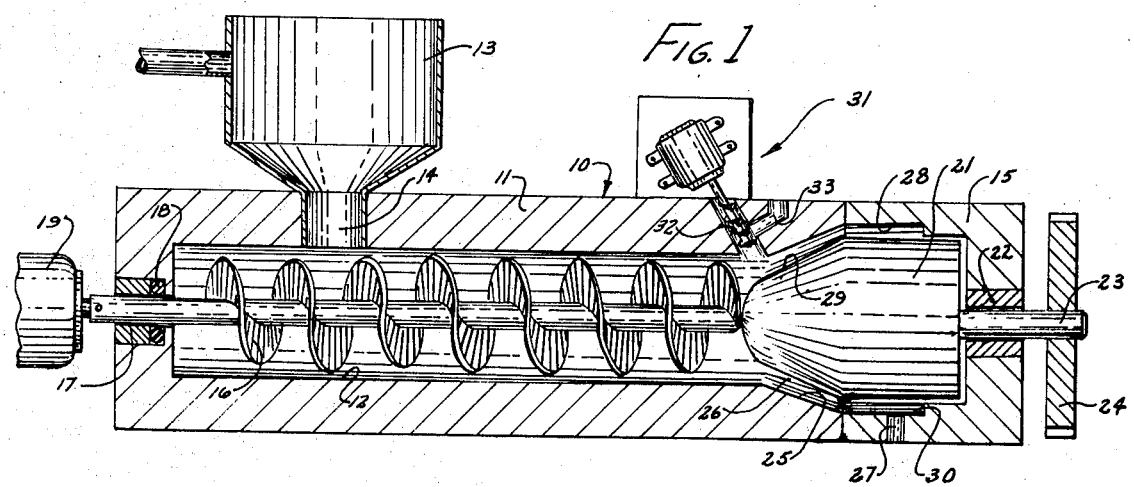
FIG. 1
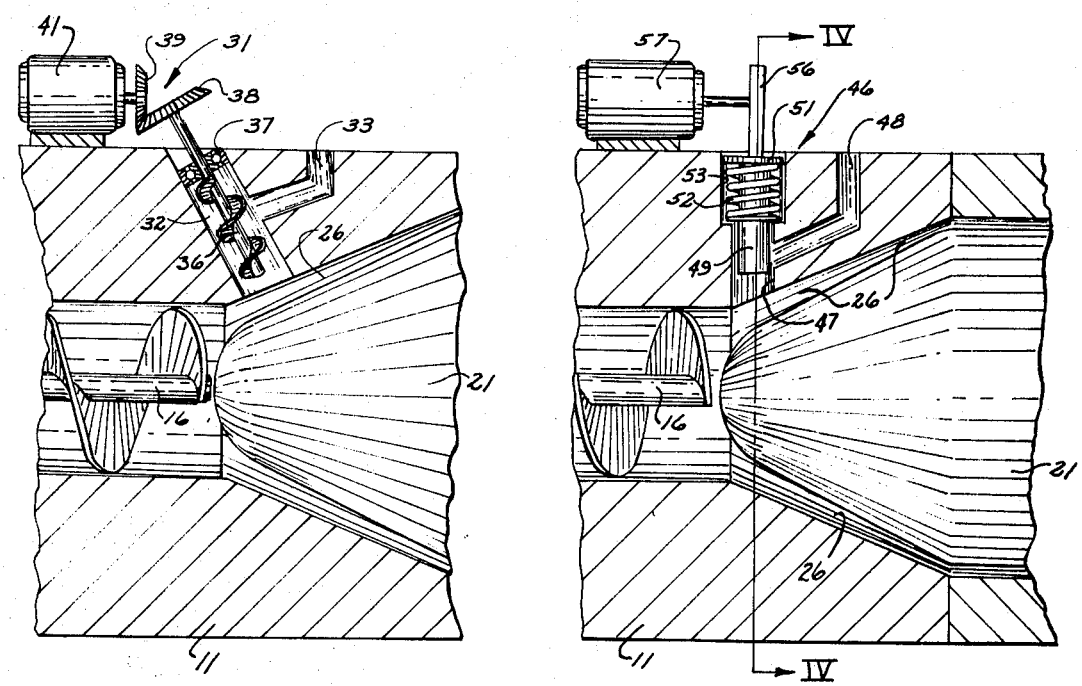
FIG. 2
FIG. 3
INVENTOR.
JAMES W. HENDRY
BY
Woodhams, Blanchard & Flynn
ATTORNEYS Oct. 27, 1970   J. W. HENDRY   3,535,737
PLASTICIZING APPARATUS WITH VOLATILE WITHDRAWAL SYSTEM
Filed July 28, 1967   2 Sheets-Sheet 2
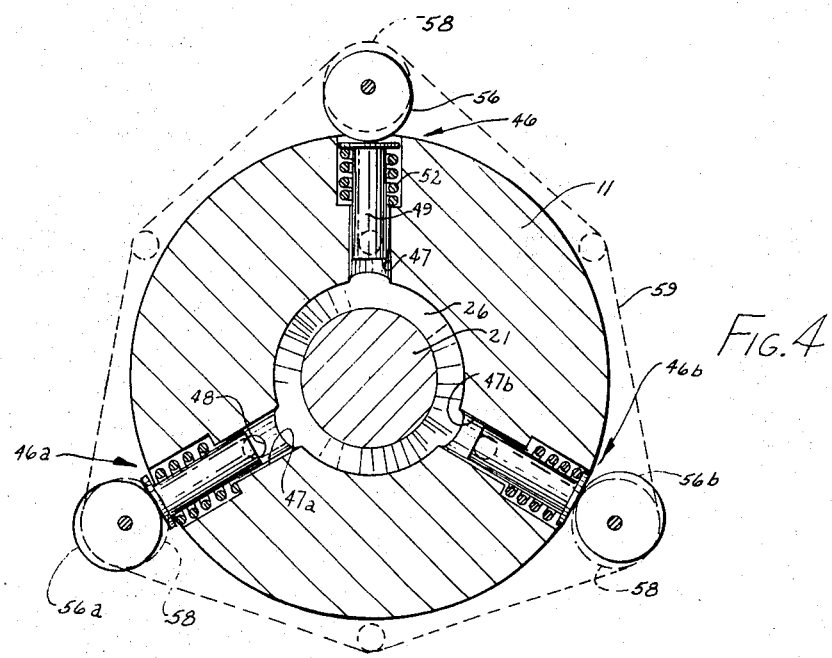
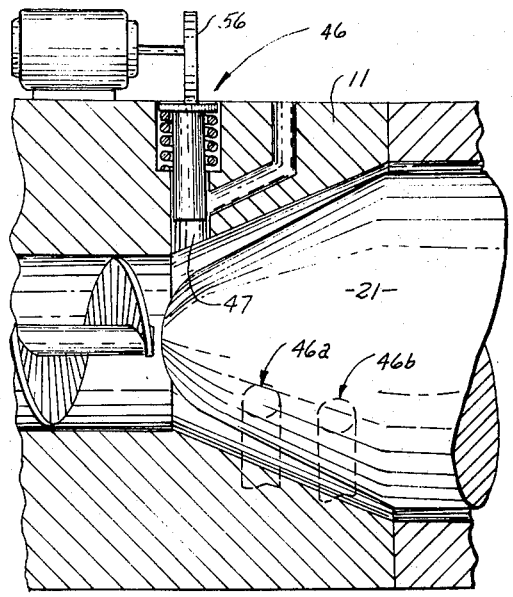
INVENTOR.
JAMES W. HENDRY
BY
Woodhams, Blanchard & Flynn
ATTORNEYS United States Patent Office 3,535,737
Patented Oct. 27, 1970

3,535,737
PLASTICIZING APPARATUS WITH VOLATILE WITHDRAWAL SYSTEM
James W. Hendry, Helena, Ohio, assignor to Borg-Warner Corporation, Chicago, Ill., a corporation of Illinois
Filed July 28, 1967, Ser. No. 656,755
Int. Cl. B29f 3/03
U.S. Cl. 18—12                                    8 Claims

ABSTRACT OF THE DISCLOSURE

This application relates to a vent system for a plasticizing machine having a rotatable conical plasticizing element for frictionally working and plasticizing granular material as it is forced past the periphery thereof. The machine is provided with vent means located in the housing adjacent the conical periphery of the plasticizing element, the vent means being provided with a blocking member therein which, for example, may be a rotating screw or a rapidly reciprocating ram. The blocking element permits the volatiles or other gases to be withdrawn from the plasticizing region and exhausted to the atmosphere while preventing the plasticized material from entering into and plugging the venting system.

FIELD OF THE INVENTION

This invention relates to a plasticizing machine and, in particular, relates to a machine having an improved venting system for releasing gaseous material, as air or volatiles, from the plasticizing region.

DESCRIPTION OF THE PRIOR ART

In certain prior plastic working machines, the granular or powdered plastic material has been plasticized by means of a rotating screw member confined within a barrel, the granular plastic material being deposited into the barrel and being subjected by the screw to pressure and rotationally applied friction, so as to cause the granular material to be heated and plasticized. Since the granular material on being heated releases volatile material, and may also contain a certain amount of entrapped air, which volatiles and air become entrained in the plasticized material, and since such entrained gases are damaging to the final molded product for well-known reasons, it has long been recognized as necessary to provide means to release or vent off such gases. For this purpose the prior plasticizing screw machines often provided vents axially spaced along the barrel of the screw, which vents generally communicated with the atmosphere so as to pass thereinto the gases being vented. For the most part, such vents in the rotating screw machines worked satisfactorily, particularly where the use permitted the screw to be so designed as to reduce the pressure within the barrel in the regions adjacent the vents. However, the vents still occasionally may become plugged with plasticized material and hence still may not permit the escape of air and volatiles therethrough.

Certain other plasticizing machines have utilized means wherein rotating cones or disks are used to plasticize the granular material supplied adjacent thereto. Such means generally have the granular material fed between closely spaced, relatively moving, surfaces such as the periphery of a rotating cone and the surface of a stationary surrounding barrel member. Due to the frictional effects on the plastic material of the relatively moving surfaces, the material is plasticized and the volatiles are released. However, the use of conventional vents passing through the barrel in the plasticizing region has been found to be unsatisfactory since there is no possibility here of reducing the pressure on the material in the region of the vents. Hence the pressure developed therein by the feeding means, together with the centrifugal action of the rapidly rotating element, forces plasticized material into the vent openings to plug the same and thereby prevents the volatiles from escaping. Thus, the volatiles, and any entrained air, remain in the plasticized material and form bubbles in the end product.

Accordingly, the major objects of the present invention include:

(1) To provide a plasticizing machine with an improved venting system in the plasticizing region.

(2) To provide a venting system for a plasticizing machine which can be used effectively even though the plastic material is under pressure in the region adjacent the vents.

(3) To provide a plasticizing machine of the type wherein plastic granules are forced under pressure between relatively moving, usually smooth, surfaces which machine has an improved venting system in the plasticizing region whereby the volatiles and other gases are uniformly and continuously released to the atmosphere.

(4) To provide a machine, as aforesaid, having a venting system which permits the continual release of entrapped volatiles and other gases without becoming plugged by the plasticizing material.

(5) To provide a machine, as aforesaid, in which the venting system continuously permits the volatiles and other gases to escape from the plasticizing region while having blocking means therein for preventing the plasticizing material from entering into and plugging the venting system.

(6) To provide a machine, as aforesaid, in which the venting system contains a rotating screw in the vent whereby gases are continuously permitted to escape from the plasticizing region while the screw prevents the plasticized material from entering into and plugging the vents.

(7) To provide a machine, as aforesaid, in which the venting system contains a rapidly reciprocating piston, the piston permitting the volatiles to escape but not permitting the plasticized material to enter into and plug the vent openings.

Other objects and purposes of this invention will be apparent to persons acquainted with machines of this type upon reading the following specification and inspecting the accompanying drawings.

BRIEF DESCRIPTION OF THE DRAWINGS

In the drawings:

FIG. 1 is a side elevational view, shown in section, of a plasticizing machine with an improved venting system thereon according to the present invention.

FIG. 2 is a fragmentary-sectional view showing one form of the improved venting system.

FIG. 3 is a fragmentary-sectional view similar to FIG. 2 showing a modified form of an improved venting system.

FIG. 4 is a section taken on line IV—IV of FIG. 3.

FIG. 5 is a schematic indication on a drawing similar to FIG. 3 of a further modification involving axially offset positioning of the vent passageways.

Certain terminology will be used in the following description for convenience in reference only and will not be limiting. The words "upwardly," "downwardly," "rightwardly" and "leftwardly" will designate directions in the drawings to which reference is made. The word "forwardly" will refer to the direction of the material flow through the device and the word "rearwardly" will refer to the opposite direction. The words "inwardly" and "outwardly" will refer to directions toward and away from, respectively, the geometric center of the device and designated parts thereof. Said terminology will include the words above specifically mentioned, derivatives thereof, and words of similar import.

SUMMARY OF THE INVENTION

The plasticizing machine according to the present invention generally comprises a rotating plasticizer cone being fed by means of pressure generating means, such as a feed screw or ram, located within a feed barrel. A feed hopper is located thereabove for supplying granular or powdered plastic material to the feed barrel for transport to the rotating cone. The granular material is plasticized in a region defined by the conical periphery of the rotating cone and the confronting interior of the feed barrel fixedly mounted thereabout. Located in the feed barrel in the vicinity of the plasticizing region is a vent system for permitting the volatiles and any entrapped air to be released from the plasticized material. A movable blocking means is located within the vent opening to prevent the plasticized material from entering into the opening while permitting the volatiles to pass therethrough. The movable blocking means preferably comprises a rotatable screw member located within the vent opening whereby the screw permits the volatiles to pass therethrough but prevents the passage of the plasticized material. Alternatively, the movable blocking means may comprise a rapidly reciprocable piston located in the opening, the reciprocation of the piston being sufficiently rapid such that the gases are permitted to escape while the slower moving plasticized material is maintained within the plasticizing region.

DETAILED DESCRIPTION

Referring to FIG. 1, there is shown a plasticizing machine having a housing 10 comprising a pair of separable parts 11 and 15, the part 11 being a stationary feed barrel with a feed opening 12 therein. Disposed above the feed barrel 11 is a hopper 13, which hopper contains a supply of material, preferably granular plastic material, for supplying the same to the feed barrel 11. The material within the hopper 13 is in communication with the feed barrel opening 12 by means of an opening 14 therebetween. A pressure creating device, here a feed screw 16, is mounted within the opening 12 and extends along the length thereof, a portion of the screw 16 being disposed directly underneath the feed opening 14 for pushing the material deposited from the hopper along the feed barrel into the plasticizing region 26. The feed screw 16 is rotatably supported within the feed barrel by means of bearings 17, a seal 18 also being preferably mounted between the barrel 11 and the screw 16 so as to prevent the passage of air, grease and other contaminative material into the feed barrel opening. The extending end of the screw 16 is coupled to a motor 19 whereby the screw is rotatably driven.

Mounted within the housing 10 coaxially with the feed screw 16 is a conical plasticizing element 21, which cone is supported within the part 15 by bearings 22 for rotation relative to the feed barrel. One end of the cone has a shaft 23 extending therefrom upon which is mounted a gear 24 driven by any conventional means for rotation thereof. Rotation of the gear 24 causes the cone 21 to rotate within the feed barrel 11, the cone 21 and the feed screw 16 thus being mounted for coaxial rotation.

The end of the feed barrel 11 adjacent the part 15 is formed with a diverging conical opening 25 therein, the inner end of the conical opening converging to a diameter equal to that of the feed opening 12, the end of the part 15 adjacent the feed barrel 11 being similarly formed with a cylindrical opening 28 therein having a diameter equal to the maximum or outer diameter of the conical opening 25. The rotatable plasticizing element 21 is so positioned within the housing 10 that the conical nose portion 29 of the cone is disposed closely adjacent the conical opening 25, which opening effectively forms a seat therefor. A small clearance 26 exists between the opening 25 and the nose portion 29 so as to permit the material to pass therethrough. Similarly, the cylindrical opening 28 surrounds the cylindrical portion of the cone 21 and is of a slightly larger diameter so as to define a small annular clearance or passageway 30 therebetween. The passageway 30 interconnects the passageway 26 with an outlet opening 27 whereby the plasticized material can be passed therethrough. The size of the openings 26 and 30 is greatly magnified in the drawings for purposes of illustration. However, the size of the openings, especially the opening 26, in the actual device is of small magnitude since small clearances result in very rapid heating and plasticizing of the material as it passes through the opening 26.

As illustrated, the passageway or clearance 26 between the seat 25 and the conical nose portion 29 is generally of a uniform width throughout its length so as to insure rapid heating and plasticizing of the material as it passes therethrough. However, the clearance 26 need not be of uniform width throughout its length since in some situations various rates of plasticizing may be desirable. Thus, the degree of taper formed on the seat 25 and on the nose portion 29 need not be the same and the opening 26 may be designed so as to be either convering or diverging as the material passes therethrough, the exact shape of the opening being determined by the desired plasticizing characteristics and the type of material being utilized. Further details of such a device are given in my copending application Ser. No. 612,676, now Pat. No. 3,358,334.

When some of the material contained within the hopper 13 is allowed to pass through the feed opening 14 into the feed barrel opening 12, rotation of the feed screw 16 causes the material to be pushed axially along the feed barrel until the material comes into contact with the periphery of the rotating cone 21. The screw 16 forces the material into the plasticizing region 26 adjacent the conical periphery 29 of the rotating cone 21. Due to the high-speed rotation of the cone 21, the material forced into the region 26 is frictionally worked and thus plasticized, which material then continues to pass along the passageway 30 and is permitted to pass out through the opening 27 whereby the material is then passed to suitable injection, extrusion or other molding means.

When the granular material is plasticized in the region 26, volatiles are released by the material, which volatiles must be removed from the plasticized material before the material is permitted to pass through the outlet opening 27. To accomplish this, a venting means indicated generally at 31 is provided. The venting means 31 contains a primary opening 32 which is in communication with the plasticizing region 26 at a point therein where the granular material has become heated sufficiently to drive off the majority of its volatiles but has not yet entirely lost its granular condition. A secondary opening 33 is provided, which opening communicates with the primary opening 32 and the atmosphere (or other gas receiving and disposal means).

During the plasticizing operation, the volatiles formed and entrapped within the plasticizing region 26 will pass through vent means 31 by travelling upward through the primary opening 32 to the junction with the secondary opening 33 and then will pass through the secondary opening 33 to the atmosphere. However, due to the rapid rotation of the cone 21, and due also to the pressure imposed on the material by the pressure creating means 16, plasticized material could be pushed into the opening 32 and would thereby tend to plug the same. To prevent this, a movable blocking member is mounted within the primary opening 32 for preventing plasticized material from appreciably entering thereinto.

As shown in FIG. 2, one form of movable blocking member comprises a rotatable screw member 36 having one end rotatably supported by a bearing 37 contained in the feed barrel 11. Mounted on the end of the rotatable screw 36 in this embodiment is a first bevel gear 38 which is in meshing engagement with a second bevel gear 39 mounted on the shaft of a motor 41. Rotation of motor 41 likewise causes rotation of the blocking screw 36, the rotational direction and screw pitch being such that it prevents plasticized material from passing into the primary opening 32. However, due to the clearances between the screw 36 and the interior wall of the opening 32, and since the plastic material is still somewhat granular at this point, the volatiles can pass therethrough into the opening 33 for exhausting into the atmosphere. The motor 41 and the gears 38 and 39 are shown for purposes of illustration only since the rotatable blocking screw 36 could obviously be driven by any other conventional means. For example, as illustrated in FIG. 1, the screw 36 could be directly coupled to the motor with the motor mounted on an upstanding flange member. Furthermore, control means could be utilized whereby the rotatable screw 36 would be automatically controlled and rotated whenever the cone 21 is rotated.

A modified form of the venting system comprising the present invention is illustrated in FIG. 3. The plasticizing region 26 is here in communication with vent means indicated generally at 46, the vent means containing a primary opening 47 wihch communicates directly with the plasticizing region 26 and a secondary opening 48 which communicates with the primary opening 47 and the atmosphere (or other collecting and disposal means). Similar to the form of FIG. 2, the passageway 47 preferably communicates with the opening 26 at a point therein where the plastic material is still somewhat granular in order to permit gases to flow therethrough to said vent passageway. Contained within the primary opening 47 is a movable blocking member 49, which blocking member is a rapidly reciprocating piston or ram. The piston 49 may be rapidly reciprocated by any conventional means such as by a mechanical linkage or by pneumatic or hydraulic control means. The piston 49 has a stroke of sufficient length that the junction between the openings 47 and 48 is intermittently opened and closed. When the blocking piston 49 is in its retracted position outwardly from the cone 21, the opening 48 is in communication with the opening 47 whereby the volatiles and gases contained within the plasticized region 26 are permitted to travel through the openings 47 and 48 and escape to the atmosphere. During its inward movement the reciprocating piston 49 seals or closes off the opening 48 and the front end of the piston acts as a ram and pushes the plasticized material which has entered the end of the opening 47 back into the plasticizing region 26. The piston 49 is reciprocated rapidly since the light weight of the gas permits the gas to respond to the rapid piston movement and thus the gas is permitted to escape through the passages 47 and 48. On the other hand, the high density and viscosity of the plasticized material does not permit it to respond to the rapid reciprocation of the piston and therefore the plasticized material has very little tendency to enter into the passage 47 and cause stoppage thereof.

One form of mechanical means which can be utilized to actuate the ram 49 is illustrated in FIG. 3. The ram 49 is formed with a flange 51 on the upper end thereof, a spring 52 surrounds the ram and has one end abutting the underside of the flange 51 with the other end of the spring abutting the bottom surface of an opening 53 formed within the housing 11. The spring 52 thus tends to bias the ram 49 in an outward direction so as to uncover the passage 48. The flange 51 is biased into engagement with the periphery of a rotatably driven cam member 56, which cam member is mounted on the shaft of a motor 57. The cam 56 is designed so as to have a circumferentially short low zone in the periphery thereof, the remainder of the cam being of a generally uniform radius. The cam 56 thus tends to maintain the ram in a depressed condition whereby the opening 48 is closed by the lower extremity of the ram. However, as the cam rotates, the low zone formed within the periphery of the cam comes into alignment with the flange 51 whereby the spring 52 is permitted to drive the ram outwardly so as to open the passage 48 momentarily. The volatiles are thereby permitted to pass therethrough and escape. Shortly after the opening of the passage 48, the cam 56 again cams the ram 49 downwardly against the urging of the spring 52 so as to close off the opening 48.

As shown in FIG. 4a a plurality of vent means 46, 46a and 46b may be provided in communication with the plasticizing region 26. Preferably, such plurality of vent means are provided circumferentially around the cone in an equally spaced relationship, thus providing a more efficient and ready escape for the volatiles entrapped within the plasticizing region 26. Any suitable actuating and timing means may be provided for said rams, such as multiple cams 56, 56a and 56b, all driven through any suitable means, such as sprockets 58 and chain 59, from the motor 57 by which all of the rams will be actuated in a siimlar manner. While such actuation may be simultaneous if desired, it is better if the rams are actuated successively to avoid appreciably varying the effective pressure on the plastic material in the zone 26.

Unlike the screw blocking system of FIG. 2, this blocking means does not assume the flow of volatiles through the material in the vent itself. Instead, the material is kept pushed out of the vents and thus said vents can communicate with region 26 at points spaced a little further downstream (to the right in FIG. 3) from the nose of the cone 21 than is desirable in the form of FIG. 2. Thus, the several vents 46, 46a and 46b shown in FIG. 4 may, if desired, be arranged, as indicated in FIG. 5, in different axial locations along the region 26. This assures still more complete release of the volatiles provided only that the material at all locations of said vents is still sufficiently granular to permit the volatiles to reach the entry parts of said respective vent passageways. Furthermore, the vent system could utilize a plurality of screw members as shown in FIG. 2 if so desired.

OPERATION

During operation of the present invention, material from the hopper 13 will pass through the feed opening 14 and be deposited in the opening 12 within the feed barrel 11. The material so deposited will be pushed axially along the opening by means of the pressure means, here the rotating feed screw 16, and will be pushed from the end of the feed screw 16 into contact with the periphery of the rotating cone 21. The high speed of rotation of the cone 21 will cause the granular material to commence to be plasticized, thus releasing volatile material during the plasticizing operation. Furthermore, the granular material has contained therein a certain amount of trapped gases, which gases will also be trapped by the material being heated within the region 26. The volatile contained within the plasticized region 26 will be permitted to escape through the hot, but still largely granular, material by passing outwardly through the openings 32 and 33 respectively. The rotating screw 36 contained within the opening 32 will prevent the plasticized material from entering into the opening 32 so as to plug the same whereby further gases would be prevented from escaping. The material will then continue outwardly along the periphery of the rotor until it reaches the outlet opening 27 whereby the plasticized material will be passed through the opening 27 and will thus be ready for use in a suitable shaping means.

If the escape means shown in FIGS. 3 and 4 is utilized, the volatiles contained within the plasticized region 26 will be permitted to escape through the openings 47 and 48 respectively, the gases being permitted to escape in an intermittent manner rather than continuously due to the rapid reciprocation of the piston 49, which piston intermittently opens and closes the opening between the passages 47 and 48. Due to the rapid reciprocation of the piston 49, the plasticized material within the region 26 will not extend into the opening 47 so as to plug the same since the plasticizing material is of a relatively high density and viscosity and thus will not respond as rapidly as the gas to reciprocation of the piston. On the other hand, the gaseous materials are of very low density and do respond to the rapid reciprocation of the piston 49 and thus are permitted to intermittently escape through the openings 47 and 48 whenever an opening 48 is uncovered by the piston 49.

It will be recognized that by this improvement the plasticizing machine can be operated for extended periods of time while continuously producing a plasticized material of high uniformity without continuing gas bubbles and voids therein. Furthermore, the self-cleansing action of the vents thus permits the machine to have a greater number of operating hours between maintenance periods, thus resulting in a greater and more efficient utilization of the machine and a less expensive plasticizing operation. The vent system disclosed above is further well adapted to all types of plasticizing machines, including conventional screw-type machines, wherein the formation of volatiles demands that vents be provided, which vents are subject to stoppage due to the solid material being passed through the machines. Hence, the venting system disclosed above is particularly suited for all types and sizes of plasticizing machines and is applicable to all types of plastic materials upon which the machines operate.

While the apparatus as described above illustrates the vent passages 33 and 48 as venting to the atmosphere, or other collecting and disposal means, it will be apparent that the above passages could also be connected, before reaching the disposal means through a suitable device, for preheating the material contained in either the feed barrel or the hopper.

Although particular preferred embodiments of the invention have been described above for illustrative purposes, it will be recognized that the variations or modifications of such disclosure which lie within the scope of the appended claims are fully contemplated.

The embodiments of the invention in which an exclusive property or privilege is claimed are defined as follows:

1. An apparatus for plasticizing particulate plastic material, comprising:
    housing means having an elongated opening therein;
    a plasticizing rotor rotatably positioned within said elongated opening;
    said housing means having an internal wall defining said elongated opening with said wall being radially spaced from the exterior surface of said plasticizing rotor to define an annular plasticizing zone therebetween;
    the exterior surface of said plasticizing rotor having an axially elongated, tapered portion which diverges in the normal direction of material flow through said plasticizing zone;
    drive means interconnected to said plasticizing rotor for causing rotation thereof;
    means for permitting said particulate plastic material to be deposited into said elongated opening at a location spaced from said plasticizing rotor;
    pressure means movably mounted within said elongated opening for forcing said particulate plastic material longitudinally through said opening into and through said plasticizing zone;
    vent means communicating with said plasticizing zone substantially adjacent said tapered exterior surface of said rotor for permitting escape of volatiles from said plasticizing zone, said vent means including vent passageway means and blocking means movably mounted within said vent passageway means for forcing plasticized material entering said vent passageway means back into said plasticizing zone while permitting the volatiles to escape therethrough, said vent passageway means communicating with said plasticizing zone substantially adjacent the entrance end thereof whereby material within said zone is at least partially granular to permit volatiles to flow therethrough into said vent passageway means.

2. An apparatus according to claim 1, wherein said pressure means includes an elongated member positioned within said elongated opening and movable relative to said housing means for advancing material along said opening from said location to said plasticizing zone, said elongated member causing said particulate material to be pressed gainst the plasticizing surface of said plasticizing rotor, and sad elongated member having a forward end spaced from and free of connection with said rotor.

3. An apparatus according to claim 1, wherein said housing means includes conical seat means disposed adjacent one end of said opening with said seat means being positioned in surrounding relationship to said plasticizing rotor, said conical seat means flaring in the normal direction of material flow and being positioned closely adjacent to and slightly spaced from said tapered exterior surface for defining a narrow, axially elongated annular passage therebetween which diverges in the direction of material flow.

4. An apparatus according to claim 1, wherein said plasticizing rotor includes a conically shaped portion having a rounded nose formed on the upstream end thereof in substantial alignment with said elongated opening, the radial width of said plasticizing zone decreasing in the direction of material flow and the vent passageway means communicating with the plasticizing zone between the small diameter end and the large diameter end of the rotor.

5. An apparatus according to claim 1, wherein said vent passageway means includes a first passageway extending from the plasticizing zone and a second passageway in communication with said first passageway, and said blocking means is a reciprocable member disposed within and movable along said first passageway for alternately blocking and unblocking said second passageway whereby volatiles may exit through said second passageway.

6. An apparatus for plasticizing particulate plastic materials, comprising:
    housing means having an elongated opening therein;
    a plasticizing rotor rotatably positioned within said elongated opening and defining therewith a plasticizing zone;
    drive means interconnected to said plasticizing rotor for causing rotation thereof;
    means for feeding particulate plastic material into said plasticizing zone;
    vent means communicating with said plasticizing zone for permitting escape of volatiles therefrom, said vent means including a vent passageway in communication with said plasticizing zone and a blocking member slideably disposed in snug engagement within said passageway for reciprocating movement therein and means coacting with said blocking member for causing reciprocations thereof;
    said vent means including a further passageway communicating with said vent passageway and which is intermittently blocked and unblocked by said blocking member for permitting said volatiles to intermittently escape therethrough, said blocking member preventing plasticized material from entering into and blocking said vent passageway.

7. An apparatus according to claim 5, wherein there is provided a plurality of said vent means arranged circumferentially around said plasticizing zone, each of said vent means including a rapidly reciprocating ram, and means for effecting reciprocation of said rams.

8. An apparatus according to claim 1, in which said blocking means is a rotatable screw means.

References Cited

UNITED STATES PATENTS

| | | |
|---|---|---|
| 2,351,706 | 6/1944 | Robinson. |
| 2,948,665 | 8/1960 | Rubens et al. |
| 3,212,133 | 10/1965 | Herdrich _____ 18—12 |
| 3,287,477 | 11/1966 | Vesilind _____ 18—12 XR |
| 3,344,215 | 9/1967 | Witz et al. |
| 3,349,833 | 10/1967 | Hodler. |
| 2,780,834 | 2/1957 | Bernhardt _____ 18—12 |
| 2,982,990 | 5/1961 | Zomlefer _____ 18—12 XR |
| 3,114,169 | 12/1963 | Palmer et al. _____ 18—12 |
| 3,137,895 | 6/1964 | Kusch. |
| 3,350,742 | 11/1967 | Wood _____ 18—12 |
| 3,367,635 | 2/1968 | Gresch _____ 18—12 XR |

WILBUR L. McBAY, Primary Examiner